United States Patent [19]

Knöpfel et al.

[11] Patent Number: 5,147,200
[45] Date of Patent: Sep. 15, 1992

[54] METHOD OF OPERATING A FIRING INSTALLATION

[75] Inventors: Hans-Peter Knöpfel, Besenbüren; Claude Pelet, Windisch; Hans Peter, Urdorf, all of Switzerland

[73] Assignee: Asea Brown Boveri, Ltd., Baden, Switzerland

[21] Appl. No.: 619,439

[22] Filed: Nov. 29, 1990

[30] Foreign Application Priority Data

Dec. 1, 1989 [CH] Switzerland ............... 4278/89

[51] Int. Cl.$^5$ .............................................. F23C 9/00
[52] U.S. Cl. ................................... 431/11; 431/4; 431/9; 431/115; 431/215; 431/217
[58] Field of Search ............ 431/4, 11, 215, 207, 431/217, 159, 115, 116, 9; 110/264, 347

[56] References Cited

U.S. PATENT DOCUMENTS 3,174,526  3/1965  von Linde .
4,932,861  6/1990  Keller et al. .

FOREIGN PATENT DOCUMENTS 0210462  2/1986  European Pat. Off. .
0271111  12/1987  European Pat. Off. .
0166329  9/1988  European Pat. Off. .
0321809  12/1988  European Pat. Off. .
1956582  5/1971  Fed. Rep. of Germany .
2370235  11/1977  France .
59-27109  2/1984  Japan .
2043869  10/1980  United Kingdom .

*Primary Examiner*—Carl D. Price
*Attorney, Agent, or Firm*—Burns, Doane, Swecker & Mathis

[57] ABSTRACT

In a firing installation, fresh air (6) is drawn in and mixed with a fraction of flue gases (7), which are taken from the combustion chamber (1), by means of a fan (5) which acts outside of the casing of the firing installation. The fresh air/flue gas mixture (8) thus formed flows on its way to the combustion chamber (1) through a first heat exchanger (2a) whose caloric preparation is accomplished by the flue gases (7) fed in. In the combustion chamber (1) itself, this mixture flows through a heat exchanger (2) placed there. Before the mixture (9) thus preheated is fed as combustion air to a burner (4), it undergoes a further mixing with flue gases via a number of jet injectors (3), which further increases the temperature of this combustion air (10), with an optimized flue gas fraction.

9 Claims, 4 Drawing Sheets

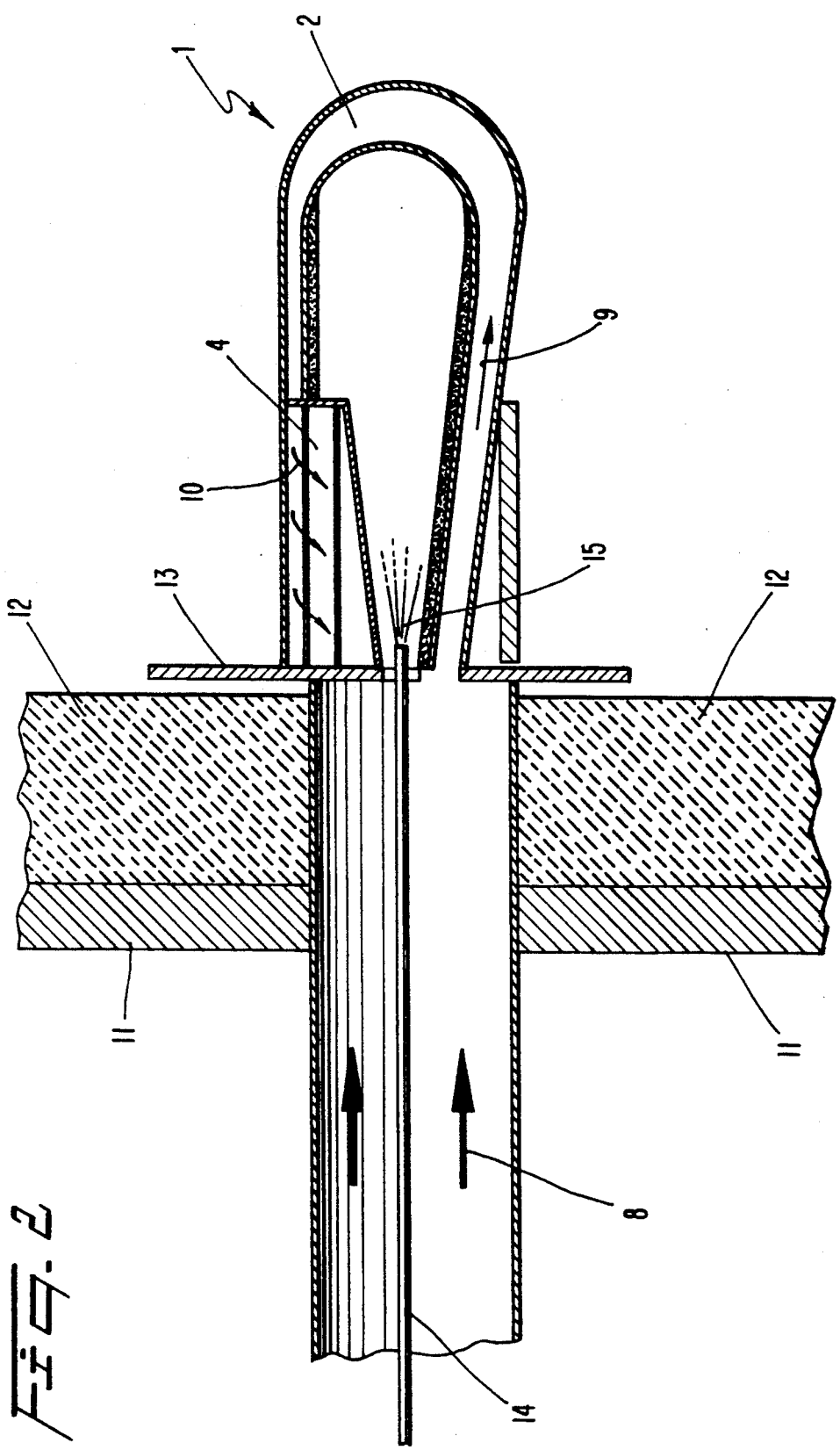

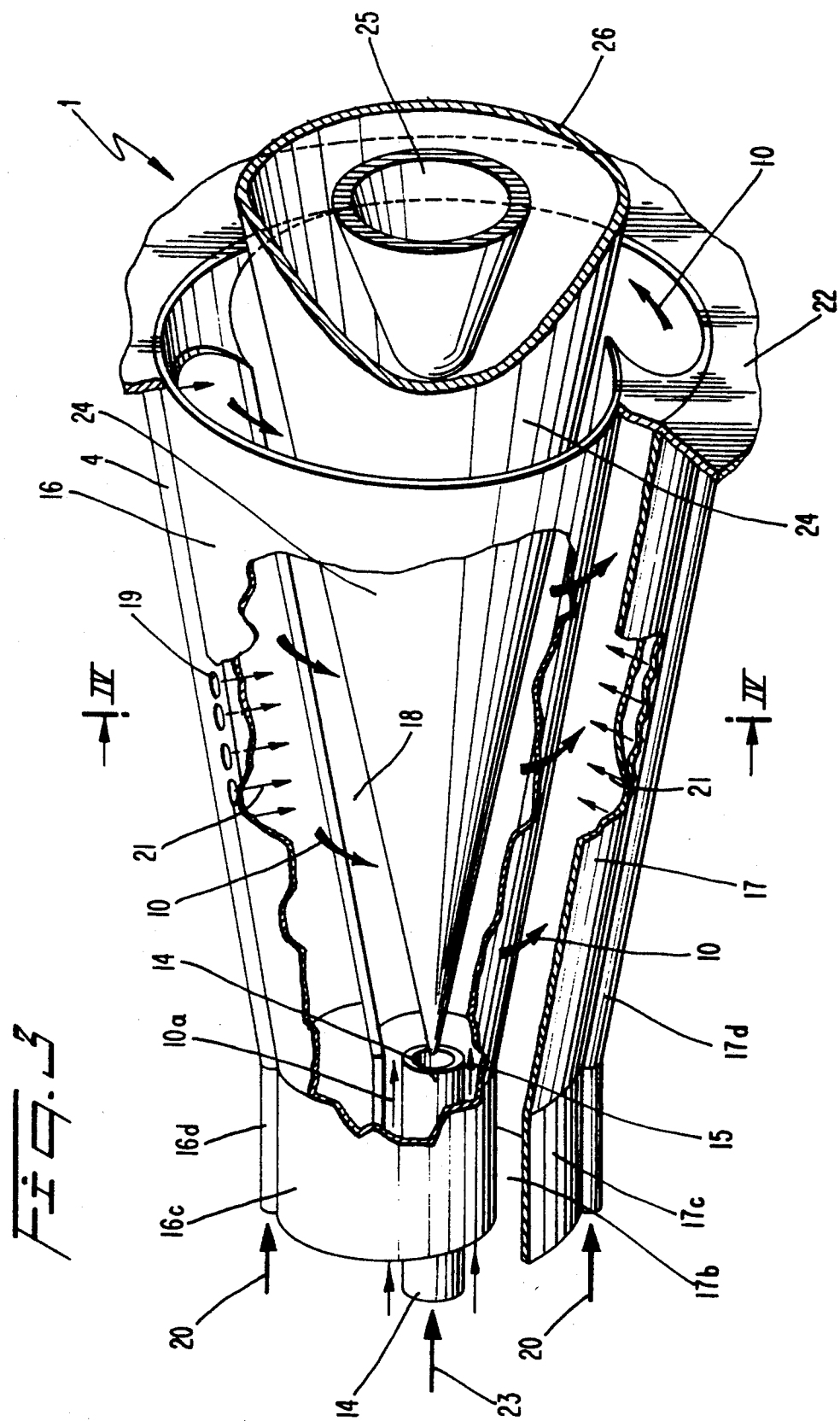

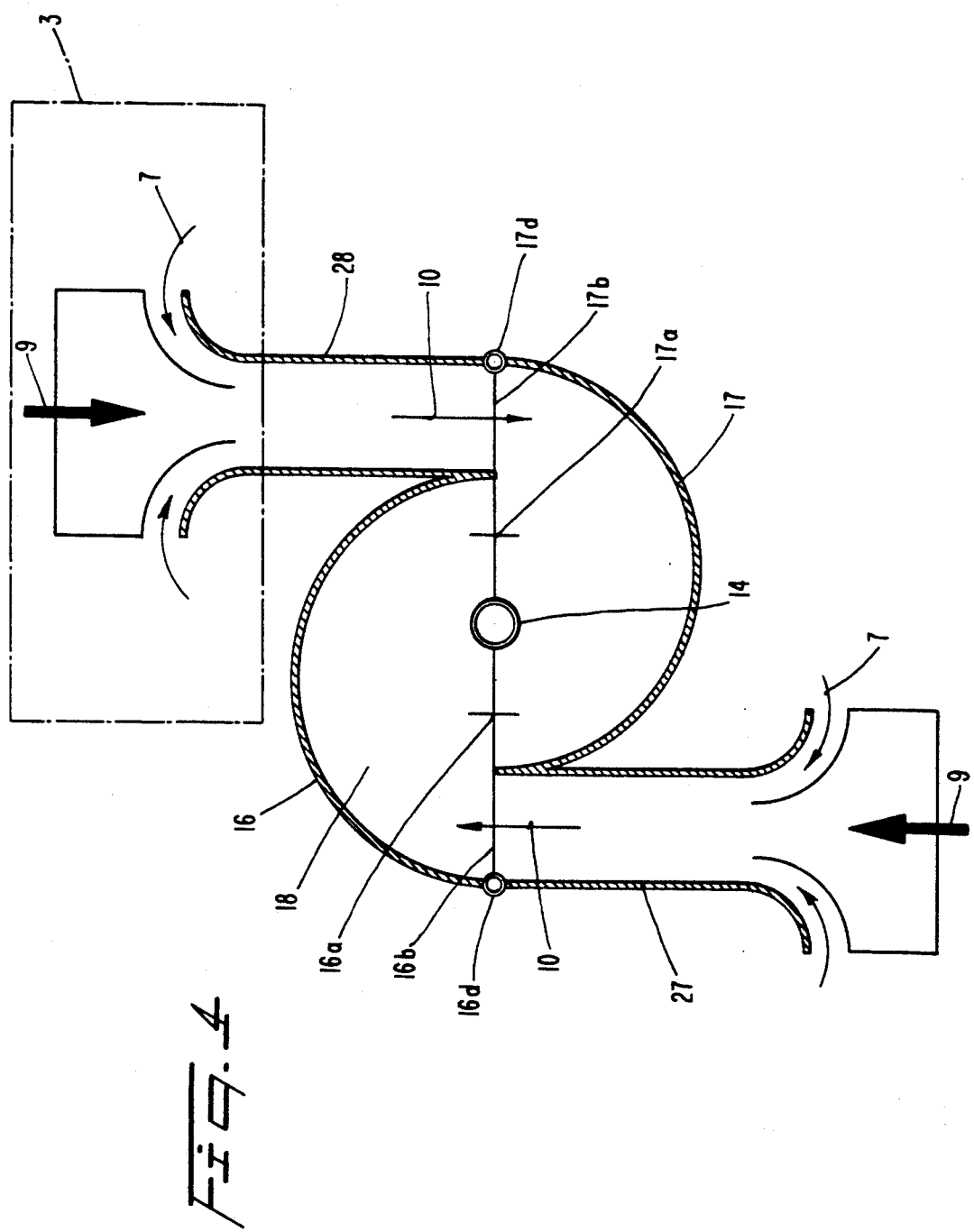

METHOD OF OPERATING A FIRING INSTALLATION

BACKGROUND OF THE INVENTION

1. Field of the Invention

The present invention relates to a method of operating a firing installation. It also relates to a burner for carrying out the method as claimed in claim 1 and to a method of operating this burner.

2. Discussion of Background

In firing installations for, for example, central heating systems, the fuel in a conventional type of construction is injected via a nozzle into a combustion chamber and burned therein with introduction of combustion air. In principle, operation of such firing installations is possible with a gaseous or a liquid fuel. When a liquid fuel is used, good atomization of the fuel and good mixing with the combustion air must be achieved in order to obtain minimum emissions of $NO_x$, CO and unburned hydrocarbons (UHC).

Accordingly, if a liquid fuel is used, the quality of the combustion with respect to low pollutant emissions largely depends on whether it is possible to provide an optimum degree of mixing of the fuel/fresh air mixture, i.e. to ensure possible complete gasification of the liquid fuel. Reference should also be made to the problems in the field of a part load operation, as discussed in EP-A2-0,166,329. Various other disclosed attempts of operating with a leaner mixture in part load operation have regularly failed since, in this case, the burn-up rate deteriorates and the CO/UHC emissions rise very steeply. In technical language, this state is circumscribed by the term $CO/UHC/NO_x$ pitch. The way of providing a premixing zone for the fuel/fresh air mixture upstream of the actual combustion zone also does not lead to the goal of a safe and reliable burner, since it involves the imminent risk of back-ignition from the combustion zone into the premixing zone causing damage to the burner.

SUMMARY OF THE INVENTION

Accordingly, one object of the invention, as it is defined in the claims, is to provide, in firing installations of the type described at the outset, a novel method and a burner for this method, which minimize the pollutant emission values.

It is to be regarded as the essential advantage of the invention that the fresh air for the burner is mixed with a fraction of flue gas, the flue gas recirculation proceeding with single-stage or multi-stage preheating and single-stage or multi-stage pre-mixing. For a close to stoichiometric combustion, a burner without a premixing length is used, which is operated at about 40% flue gas recycle. The air/flue gas mixture should here have a temperature of approximately 400° C. at the burner inlet. Meeting these two conditions leads, on the one hand, to a sufficiently low primary zone temperature of about 1,450° C., which is an important prerequisite for achieving low $NO_x$ emissions, and, on the other hand, to vaporization of the injected liquid fuel at a desired high rate. For this purpose, a part of the flue gases is taken off in or downstream of the combustion chamber of the firing installation and mixed with fresh air in an external fan. As a second process stage, this mixture is further heated in the combustion chamber itself by means of a heat exchanger provided therein and then fed to a jet injector. In the latter, further flue gases are then admixed to the mixture with the object of being able to provide an optimum combustion air temperature for the burner and a reduction in the $O_2$ concentration. Further advantages of this system are that, as a result of the two-stage heating-up of the combustion air mixture, if provided, better density ratio for the jet injector is established, i.e. in those cases where a higher output of the jet injector is demanded, this condition can be met by the abovementioned two-stage heating-up. Furthermore, since a part of the flue gases to be recirculated can already be fed to the fan, the fraction of flue gases which would have to be delivered by the jet injector is reduced when such a configuration is utilized. Since the heat exchanger is advantageously arranged around the flame in the combustion chamber, heat is taken directly from this flame, which in turn has a positive effect on the formation of $NO_x$. This results in an additional advantage of the invention, which is to be regarded as the fact that the connections for this can be adapted to the given conditions without additional expense: if the heat exchanger area is correspondingly increased, the external recirculation of the flue gases as described can be omitted, so that the preheating becomes single-stage. The advantages are the same as in two-stage preheating; in addition, this concept proves to be advantageous when, for whatever reason, no flue gas can be taken out of the combustion chamber. If premixing even outside the combustion chamber is not possible, the jet injector can, with appropriate design, mix the entire flue gas rate required. If the mixing length downstream is appropriately designed as a jet injector, sufficient preheating and mixing can also be achieved therein.

Advantageous and expedient further developments of the object achieved according to the invention are defined in the further dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein all elements not required for the immediate understanding of the invention have been omitted and wherein:

FIG. 2 shows a heat exchanger as a preheating stage of the combustion air mixture for the burner, FIG. 3 shows a burner for operation with liquid and-/or gaseous fuels in a perspective representation, appropriately cut open, and FIG. 4 shows a section through the plane IV—IV in a diagrammatic, simplified representation.

DESCRIPTION OF THE PREFERRED EMBODIMENTS

Figure 1:
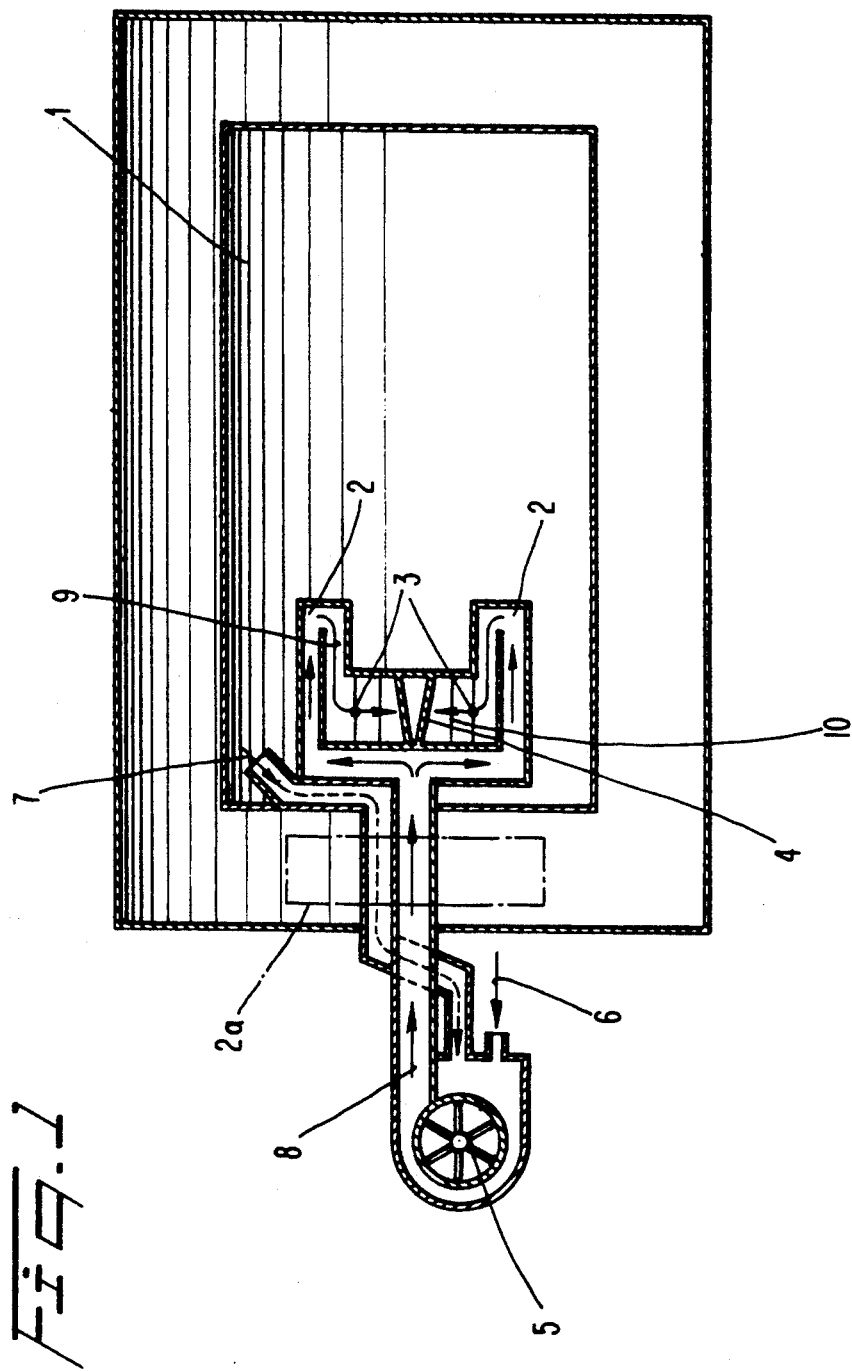
FIG. 1 shows a diagrammatic representation of a firing installation with two-stage premixing and multi-stage preheating.

Referring now to the drawings, wherein like reference numbers designate identical or corresponding charts throughout the several views, FIG. 1 diagrammatically shows a firing installation in the combustion chamber 1 of which a heat exchanger 2, a jet injector 3, a burner 4 and a flue gas take-off 7 are arranged. A fan 5 is active outside the combustion chamber. The fresh air 6 drawn in there is mixed with a fraction of flue gases which is supplied via the flue gas take-off 7 placed in the combustion chamber 1. This fresh air/flue gas mixture 8 is recycled into the combustion chamber 1, flowing through the heat exchanger 2. Before the mixture 9 thus preheated is fed as combustion air to the burner 4, it undergoes further mixing with flue gases via a number of jet injectors 3, which increases the temperature of this combustion air 10. A second heat exchanger 2a is shown between the flue gas stream 7 and the fresh air/flue gas mixture 8.

If the burner 4 is to be operated close to stoichiometrically, it is operated with about 40% flue gas recycle and, in the case of two-stage premixing, the fractions of flue gas can be appropriately divided. The second condition is that the fresh air/flue gas mixture 10 used as the combustion air should have a temperature above 400° C. when entering the burner. This preheating can be achieved, according to the concept of FIG. 1, by treating the mixture in three stages: the fresh air 6 drawn in undergoes a first preheating in the fan 5, where first mixing with hot flue gases 7 takes place. The heat exchanger 2 forms the second pre-heating stage, the mixture 8 passing, on the way to the abovementioned heat exchanger 2, through the heat exchanger 2a which can be operated by the flue gases 7. This measure has an additional positive effect on the fan 5, inasmuch as the caloric load therein is reduced. The third preheating takes place in the region of the jet injectors 3, where further flue gases 7 are fed for the second time to the preheated fresh air/flue gas mixture 9. When the said two conditions (about 40% flue gas recycle and combustion air at about 400° C.) are met, a sufficiently low primary zone temperature of about 1,450° C. can be achieved, which is a condition for low $NO_x$ emissions, and rapid vaporization of the droplets of the liquid fuel is achievable on the other hand. It is not by itself an indispensable prerequisite that the mixing of the flue gases 7 and the preheating of the combustion air 10 are carried out in a plurality of stages. If it is possible to meet those two conditions in a certain firing installation, for example solely via the admixture of the flue gases in the jet injectors, the first premixing in the fan 5 and the preheating in the heat exchanger 2 can be omitted. The advantages of the said premixings and preheating in one or more stages can be summarized generally as follows: A higher temperature of the combustion air 10 effects a high degree of fuel vaporization, which results in low $NO_x$ emissions.

A higher recirculation rate effects a further reduction of the $O_2$ concentration in the combustion air and hence a lower flame temperature, whereby the $NO_x$ emissions can be kept low.

FIG. 2 shows an embodiment of the heat exchanger 2. This is placed in the combustion chamber 1. The fresh air/flue gas mixture 8 flows through the heat exchanger 2 and heats up. The mixture 9, with admixing of further flue gases, is then fed as combustion air 10 to the burner 4. The door 11 of the combustion chamber 1 is indicated in FIG. 2: this door consists on the inside of a refractory insulation 12 which is in turn surrounded by a steel box which is no longer visible. In the combustion chamber 1 itself, a further plate 13 is provided which serves as a coupling for the burner 4 and the heat exchanger 2. In the feedline for the fresh air/flue gas mixture 8, there is also a nozzle 14 for the fuel to operate the burner 4, with the indicated fuel injection 15. Such a configuration results in an additional caloric treatment of the fuel up to about 120° C., which has an additional positive effect on rapid vaporization of the droplets of a liquid fuel preferably atomized there. This additional effect applies of course only if a certain rate of hot flue gases is fed to the fresh air in the fan, i.e. if the operation is in accordance with the diagram in FIG. 1.

FIGS. 3 and 4 should be used together for a better understanding of the construction of the burner 4. Moreover, to preserve clarity of FIG. 3, the mixing lengths and the jet injectors diagrammatically shown in FIG. 4 are not included therein.

The burner 4 according to FIG. 3 consists of two half hollow conical part bodies 16, 17 which lie on one another with an offset. The conical shape of the conical part bodies 16, 17 shown has a defined fixed angle in the direction of flow. Of course, the conical part bodies 16, 17 can have an increasing conical taper (convex form) or a decreasing conical shape (concave form) in the direction of flow. The two last mentioned forms are not covered in the drawing, since they are readily imaginable. The form which is ultimately used depends on the various parameters of the combustion. The mutual offset of the particular center axes 16a, 17a of the conical part bodies 16, 17 creates on each of the two sides in mirror arrangement a tangential free air inlet slot 16b, 17b (FIG. 4), through which the combustion air 10 (fresh air/flue gas mixture) flows into the interior of the burner 4, i.e. into the hollow space 18 of the cone. The two conical part bodies 16, 17 each have a cylindrical first part 16c, 17c, which likewise extend at a mutual offset analogously to the conical part bodies 16, 17, so that the tangential air inlet slots 16b, 17b are present right from the start. A nozzle 14 is accommodated in this cylindrical first part 16c, 17c. Of course, the burner 4 can be made purely conically, i.e. without cylindrical first parts 16c, 17c. If desired, both conical part bodies 16, 17 each have a further fuel line 16d, 17d, which are provided with orifices 19. Through the lines 16d, 17d, preferably gaseous fuels 20 are introduced tangentially via the air inlet slots 16b, 17b together with the combustion air 10 into the combustion chamber 4. The location of these fuel lines 16d, 17d is shown diagrammatically in FIG. 4: the fuel lines 16d, 17d are fitted in the region of the tangential air inlet slots 16b, 17b, so that the admixture 21 of the gaseous fuel 20 to the combustion air 10 flowing in also takes place there. Of course, mixed operation with both types of fuel is possible. On the combustion chamber side 1, the burner has a collar-shaped plate 22, through which bores (not shown) are made, if necessary, in order to feed dilution air or cooling air to the front part of the burner 1. The liquid fuel 23 preferably flowing through the nozzle 14 is injected under an acute angle into an interior 18, in such a way that a conical spray pattern which is as homogeneous as possible is established in the burner outlet plane. The fuel injection 15 can involve air-assisted atomization or pressure atomization. The conical liquid fuel profile 24 is surrounded by a combustion air stream 10 flowing in tangentially and a further combustion air stream 10a introduced axially. In the axial direction, the concentration of the liquid fuel 23 is continuously reduced by the combustion air 10 mixed in. If gaseous fuel 20/21 is used, the formation of the mixture with the combustion air 10 takes place directly in the region of the air inlet slots 16b, 17b into the interior 18. If liquid fuel 23 is injected, the optimum homogeneous fuel concentration over the cross-section is reached in the region where the vortex breaks up, i.e. in the region of the back-flow zone 25. Ignition takes place at the apex of the back-flow zone 25. It is only at this point that the stable flame front 26 can form. A back flash of the flame into the interior of the burner 4, as is always possible in the case of known premixing lengths, prevention of which being sought there by means of complicated flame traps, is not to be feared here. If the combustion air 10 is preheated, as explained under FIG. 1, accelerated integral vaporization of the liquid fuel 23 is established before the point at the outlet of the burner 4 is reached where ignition of the mixture can take place. The degree of vaporization is of course dependent on the size of the burner 4, on the drop size and on the temperature of the combustion air streams 10, 10a. The pollutant emission values are lowest in the case of complete vaporization before entry to the combustion zone. In the design of the conical part bodies 16, 17 with respect to the cone angle and the width of the tangential air inlet slots 16b, 17b, narrow limits must be adhered to, so that the desired flow field of the air with its back-flow zone 25 in the region of the burner mouth is established for stabilizing the flame. Generally, it can be said that a reduction in the size of the air inlet slots 16b, 17b shifts the back-flow zone 25 further upstream, as a result of which, however, the mixture would then be ignited earlier. Nevertheless, it can be stated here that the back-flow zone 25, once it is fixed geometrically, is positionally stable by itself, since the spin number increases the direction of flow in the region of the conical shape of the burner. Furthermore, the axial velocity can be influenced by axially feeding in combustion air 10a. The construction of the burner is outstandingly suitable, with a given overall length of the burner, for varying the size of the tangential air inlet slots 16b, 17b by shifting the conical part bodies 16, 17 towards or apart from one another, whereby the distance of the two center axes 16a, 17a is decreased or increased respectively, and the size of the gap of the tangential air inlet slots 16b, 17b varies correspondingly, as can be seen especially clearly from FIG. 4. Of course, the conical part bodies 16, 17 are also mutually displaceable in another plane, whereby even an overlap thereof can be accomplished. Indeed, it is even possible mutually to displace the conical part bodies 16, 17 spirally by a rotary move in opposite directions. There is thus scope for varying the shape and the size of the tangential air inlets 16b, 17b as desired, whereby the burner 4 can be individually adjusted without altering its overall length.

FIG. 4 is a section approximately in the middle of the burner, along the sectional plane IV—IV in FIG. 3. The inlets 27, 28 which are arranged tangentially and mirror-inverted are conceived as mixing lengths, in which the final preparation of the combustion air 10 takes place. After it has flowed through the heat exchanger, the fresh air/flue gas mixture 9 is fed to a jet injector system 3 which acts upstream of the tangential inlet slots 16b, 17b into the interior 18 of the burner 4. The effect comprises using the suction force from the flow of the fresh air/flue gas mixture 9 through the jet injector 3 for introducing a further fraction of flue gases 7 into the above-mentioned flow. The mixing of this new fraction of flue gas 7 with the mixture 9 takes place in the mixing lengths 27, 28.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a firing installation with a premixing burner, comprising the steps of:
   introducing fresh air and recirculated flue gas into an inlet of a fan means of a first stage of a multi-stage mixing and preheating system of said firing installation;
   mixing said fresh air with said recirculated flue gases with said fan means in said first stage of said system to form an initial combustion air mixture;
   heating said fresh air and said recirculated flue gases during said mixing in said first stage of said system;
   supplying said initial combustion air mixture to at least one heat exchanger of a second stage of said system;
   heating said initial combustion air mixture in said second stage of said system, said at least one heat exchanger disposed downstream of said fan;
   supplying said initial combustion air mixture to a jet injector apparatus of a third stage of said system;
   mixing said initial combustion air mixture with additional flue gas in said third stage of said system to form a final combustion air mixture, said jet injector apparatus disposed downstream of said at least one heat exchanger;
   heating said final combustion air mixture in said jet injector apparatus, said jet injector apparatus being disposed upstream of combustion air inlet slots of said premixing burner;
   supplying said final combustion air mixture to said premixing burner;
   supplying fuel to said premixing burner for combustion in said final combustion air mixture.

2. A method as claimed in claim 1, wherein said additional flue gas is mixed with said initial combustion air mixture to form a final combustion air mixture comprised of 20–50% of flue gas and wherein said final combustion air mixture is heated to a temperature substantially within the range of 50°–500° C.

3. A method of operating a firing installation as claimed in claim 1, including the steps of:
   introducing said final combustion air mixture tangentially into an interior of said burner;
   introducing said final combustion air mixture axially into said interior of said burner;
   forming a conical fuel column within said interior of said burner, said fuel column widening in a flow direction and being surrounded by tangential and axial flows of said final combustion air mixture so as to form a combustion air/fuel mixture;
   maintaining ignition of said combustion air/fuel mixture at an outlet of said burner;
   generating a back flow zone in a mouth region of said burner so as to stabilize a flame front during ignition.

4. A firing installation for performing combustion with a premixing burner comprising:
   a combustion chamber;
   a premixing burner disposed substantially within said combustion chamber;
   a multi-stage means for mixing and heating flue gases and air to produce combustion air for said premixing burner, said system including a first stage having a fan means for mixing said flue gases and said air to form an initial combustion air mixture, a second stage having at least one heat exchanger means for heating said initial combustion air mixture and a third stage having a jet injector means for mixing said initial combustion air mixture with additional flue gas to form a final combustion air mixture;

said fan means being disposed upstream of said heat exchanger means and said heat exchanger means being disposed upstream of said jet injector means;

said premixing burner including at least two hollow part-conical bodies mated together in an offset relationship and having tangential air inlet slots for receiving said final combustion air mixture, said air inlet slots extending substantially the length of said burner, said burner including a nozzle means for supplying a conical column of fuel substantially along the length of said burner, said nozzle means being disposed between said conical bodies at a burner head of said burner; and said jet injector means being disposed upstream of said tangential air inlet slots of said premixing burner.

5. A firing installation as claimed in claim 1 wherein said part-conical bodies of said premixing burner widen conically at a predetermined angle in a flow direction.

6. A firing installation as claimed in claim 4, wherein said part-conical bodies of said premixing burner have a conical taper increasing in a flow direction.

7. A firing installation as claimed in claim 4, wherein said part-conical bodies of said premixing burner have a conical taper decreasing in a flow direction.

8. A firing installation as claimed in claim 4, wherein said burner includes fuel nozzles positioned at an inlet region of said tangential air inlet slots.

9. A firing installation as claimed in claim 4, wherein said nozzle means includes means for providing liquid fuel along substantially the length of the burner and said fuel nozzles include means for feeding gaseous fuel to said tangential inlet slots.

* * * * *